United States Patent [19]

Maurer

[11] Patent Number: 5,327,785
[45] Date of Patent: Jul. 12, 1994

[54] PRESSURE SENSOR WITH IMPROVED HEAT DISSIPATION CHARACTERISTICS

[75] Inventor: D. Joseph Maurer, Jo Daviess County, Ill.

[73] Assignee: Honeywell Inc., Minneapolis, Minn.

[21] Appl. No.: 28,499

[22] Filed: Mar. 9, 1993

[51] Int. Cl.$^5$ .............................. C01L 7/08; C01L 9/06
[52] U.S. Cl. ................................. 73/756; 29/621.1; 73/721; 73/727; 338/4
[58] Field of Search .................. 73/721, 727, 706, 708, 73/756, 862.68; 338/4, 42; 29/621.1

[56] References Cited

U.S. PATENT DOCUMENTS

| | | | |
|---|---|---|---|
| 4,656,454 | 4/1987 | Rosenberger | 338/42 |
| 5,060,527 | 10/1991 | Burgess | 73/862.68 |
| 5,184,107 | 2/1993 | Maurer | 338/4 |

OTHER PUBLICATIONS

Article dated Dec. 4, 1972 in Electronics Magazine entitled "Integration Brings a Generation of Low-Cost Transducers" by Ziss and Hare.

Primary Examiner—Donald Woodiel
Attorney, Agent, or Firm—William D. Lanyi

[57] ABSTRACT

A pressure sensor is provided with a means for efficiently removing heat from a circuit portion of a sensor die by providing an elastomeric member between a first surface of the sensor die and electrical leads. A thermally conductive, but electrically insulative, portion of the elastomeric member is disposed between the circuit portion of the sensor die and the leads and a means is provided for urging the first surface of the sensor die into thermal communicating contact with the thermally conductive portion of the elastomeric member. In addition, a selectively conductive portion of the elastomeric member is disposed between contact pads on the first surface of the sensor die and electrical leads encapsulated within a portion of the sensor housing. The elastomeric member is also provided with an opening formed therethrough and aligned with the diaphragm portion of the sensor die to permit the media to be in fluid communication with the diaphragm of the sensor die. The improved sensor die arrangement provided by the present invention can be adapted for use in either an absolute pressure sensing embodiment or a differential pressure sensing embodiment.

15 Claims, 5 Drawing Sheets

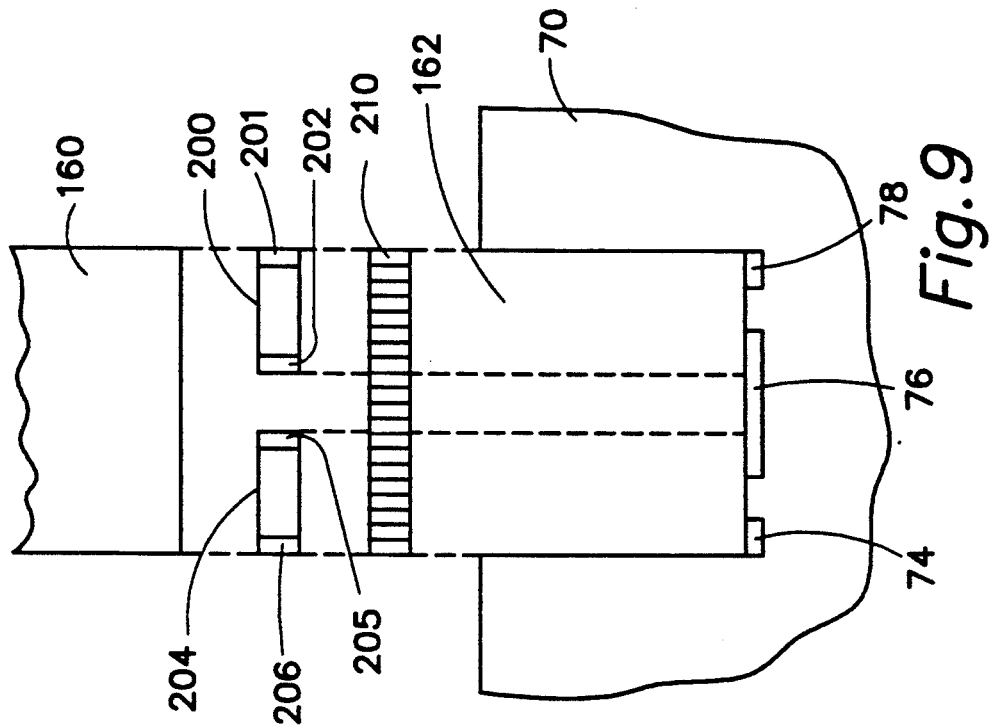
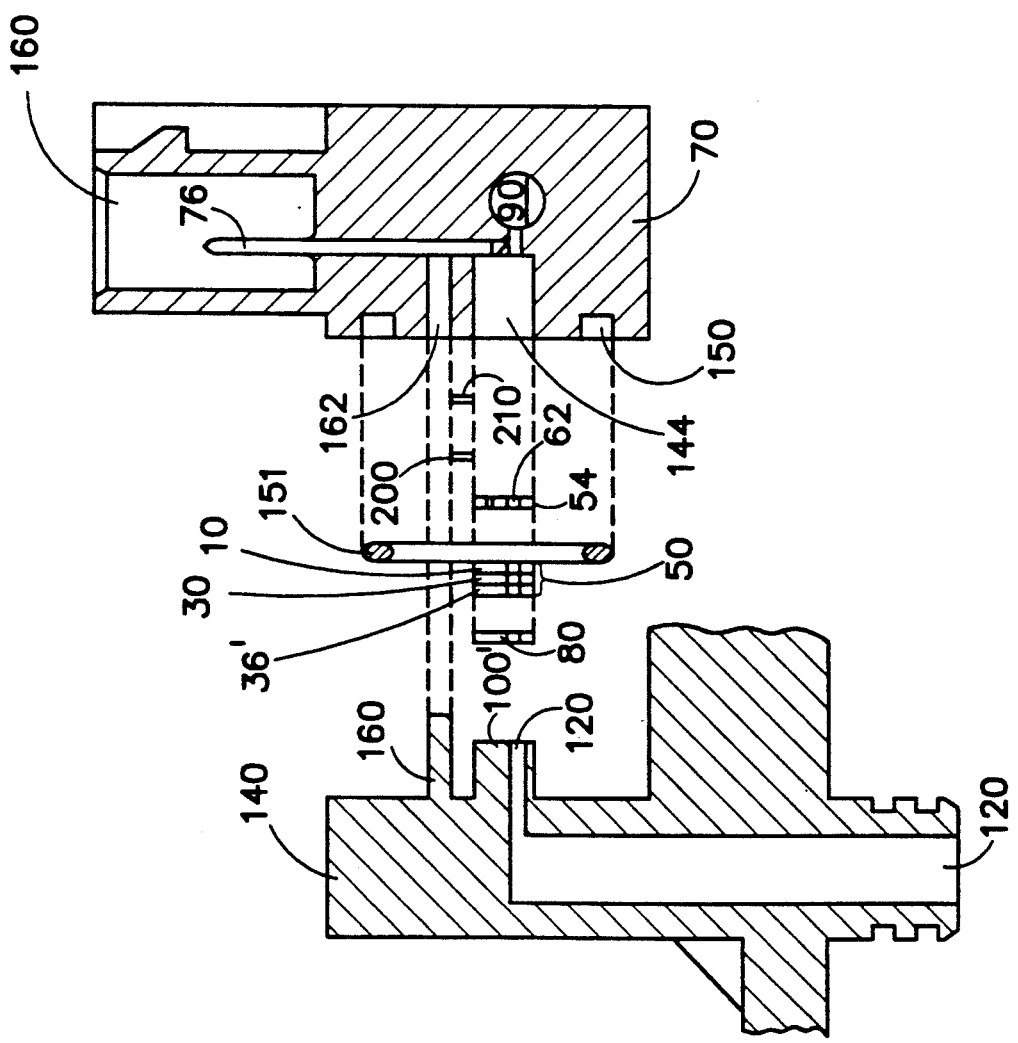

PRESSURE SENSOR WITH IMPROVED HEAT DISSIPATION CHARACTERISTICS

BACKGROUND OF THE INVENTION

1. Field of the Invention

The present invention relates generally to a pressure sensor and, more particularly, to a pressure sensor that is provided with a thermally conductive member disposed between a heat producing portion of a pressure sensor die and one or more electrical leads which are used to dissipate the heat in cooperation with heat dissipation through the housing structure of the pressure sensor structure.

2. Description of the Prior Art

Many different types of pressure sensors are well known to those skilled in the art. One particular type of pressure sensor comprises a silicon die that has a first surface and a second surface. The first surface comprises a relatively thin layer of material, such as or silicon nitride. The second surface is partially etched to form a cavity through a portion of the thickness of the die. Since the cavity in the second surface does not completely penetrate through the thickness of the die, a portion of the first surface extends, as a diaphragm, over the cavity. Piezoresistive components are disposed on the diaphragm and are sensitive to distortions of the diaphragm in response to pressure changes.

Certain pressure sensor applications also incorporate a plurality of electronic components formed in a portion of the first surface of the sensor die. These electronic components form amplification and linearization circuits that are connected in signal communication with the piezoresistive components on the diaphragm. In applications of this type, the electronic components produce heat which must be dissipated so that the pressure sensor die is not adversely affected by the temperature changes that could otherwise occur as a result of the heat produced by the integrated circuit comprising the electronic components.

U.S. patent application Ser. No. 07/962,641, which was filed by Maurer on Oct. 16, 1992 and assigned to the assignee of the present application, discloses a pressure sensor that is specifically adapted for use with a component carrier. It is provided with a housing member that is attached to a rigid and generally planar member, such as a ceramic circuit board. The legs of the housing member can pass through holes in the circuit board or, alternatively, can attached to edges of the board. The legs of the housing are provided with bails which have steps shaped to seize the circuit board after the legs are flexed to permit insertion of the board between them. The housing is provided with an opening that is shaped to receive a media seal, a pressure sensor die and a conductive seal between a surface of the opening and a surface of the ceramic circuit board. When the circuit board is attached to the housing, the seals and the pressure sensor die are compressed therebetween to provide good fluid sealing association between the components and to also provide electrical communication between the components on the pressure sensor die and the components on the circuit board. An alternative embodiment of the sensor comprises two housing members that are attached to opposite sides of the same circuit board so that a differential pressure sensor can be provided.

U.S. Pat. No. 4,656,454, which issued to Rosenberger on Apr. 7, 1987, discloses a piezoresistive pressure transducer with elastomeric seals. A piezoresistive stress sensitive element in the form of a diaphragm of semiconductor material is provided with a thickened rim to hold the diaphragm between a pair of premolded elastomeric seals in a thermoplastic housing. Electrical connections with external circuitry are made with strain relief jumpers which connect conductive regions on the element outside the seals to conductors which pass through the housing wall.

Selectively conductive elastomeric components are available in commercial quantities from Fujipoly and are referred to as the low resistance ZEBRA elastomeric connectors. They are constructed of alternating parallel layers of electrically conductive and nonconductive silicon elastomer. The electrically conductive layers are filled with silver-metal particles. The low resistance elastomeric connectors of this type provide a redundant connection with a minimum of two conductive layers recommended for each printed circuit contact pad. The connectors are available with an insulating barrier or silicon supports. The connectors are used for connecting electroluminescent and plasma type displays to printed circuit boards or for connecting hybrid circuits to printed circuit boards. In the Dec. 7, 1989 edition of EDN Magazine, an article titled "Elastomeric Connectors" by J. D. Mosley describes elastomeric connectors and many different types of applications where they can be used. Several sources of these connectors, such as Fujipoly and Elastomeric Technologies, are discussed in this article along with many different types of connectors provided by the suppliers.

In the Dec. 4, 1972 edition of "Electronics" magazine, an article titled "Integration Brings A Generation Of Low-Cost Transducers" was written by Arthur R. Zias and William F. J. Hare. This article discusses pressure transducers which use an all silicon vacuum reference chamber and a Wheatstone bridge arrangement of diffused piezoresistive resistors to measure pressures over a large range.

The thermally conductive and electrically insulative component which is utilized by the present invention is a commercially available component. It can be purchased from the Bergquist Company under the name "SIL-PAD".

The elastomeric components described above are well known to those skilled in the art. Although many different techniques are used to provide the selective conductivity of the elastomeric connectors, they share a common characteristic of conducting electrical current in one direction through their thickness while preventing the conduction of electric current in other directions through the elastomeric member. The thermally conductive elastomeric material described above is electrically insulative in all directions through its structure. These materials are all available in commercial quantities from several different suppliers. Although the elastomeric portions of the present invention, as will be described below, are arranged in a particular configuration to specifically suit the needs of the present invention, it should be clearly understood that each of the separate portions of the elastomeric elements of the present invention are individually known to those skilled in the art and to those companies that manufacture the various forms of elastomeric materials.

U.S. patent application 07/961,994, which was filed by Maurer on Oct. 16, 1992, and assigned to the assignee of the present application, describes a force sensor that incorporates a pressure transducer disposed within a housing structure. A force transmitting means, such as a shaft which is slidably disposed within an opening, is provided to communicate force from an external source to a diaphragm of a pressure sensor. An elastomeric conductor is disposed between electronic components on the diaphragm of a pressure sensor die and conductive leads that are used to communicate signals from pressure sensor die to components which are disposed externally relative to the force sensor.

U.S. Pat. No. 5,184,107, which issued to Maurer on Feb. 2, 1993 discloses a low cost piezoresistive pressure transducer which utilizes premolded elastomeric seals in which at least one seal is electrically conductive. A piezoresistive stress sensitive element in the form of a diaphragm of a semiconductor material is provided with a thickened rim and is held at its rim between a pair of premolded elastomeric seals in a two piece housing. Electrical connections with external circuitry are made by conductive paths through one of the elastomeric seals which makes contact with electrical leads which pass through a housing wall.

SUMMARY OF THE INVENTION

The present invention, in a preferred embodiment, comprises a pressure sensor die which has a diaphragm portion, a circuit portion and a contact portion on a first surface of the die. The sensor die also has a second side with a cavity formed therein and aligned with the diaphragm portion. The circuit portion comprises a plurality of electronic components connected to form a circuit which is, in turn, connected in signal communication with piezoresistive components formed on the diaphragm portion. Sensor dies of this type are well known to those skilled in the art. A preferred embodiment of the present invention also comprises an elastomeric member having a cavity portion, a selectively conductive portion and a thermally conductive portion which is electrically insulative.

The present invention further comprises a housing structure which has at least one electrically conductive lead that can be partially encapsulated within the structure of the housing. An opening is formed in the housing in a preferred embodiment of the present invention, and a portion of the lead is exposed within the opening. The elastomeric member is disposed in contact with the first surface of the sensor die. The cavity portion of the elastomeric member is disposed in contact with the diaphragm portion of the sensor die, and the selectively conductive portion of the elastomeric member is disposed in contact with the contact portion of the sensor die. The contact portion of the sensor die comprises a plurality of electrically conductive contact pads that are connected in electrical communication with the circuit portion of the die for the purpose of permitting the circuit of the pressure die to be connected in electrical communication with external components. The thermally conductive portion of the elastomeric member is disposed in contact with the circuit portion of the sensor die where most of the heat produced by the pressure sensor die is expected to originate. The thermally conductive portion of the elastomeric member is also disposed in contact with the lead of the housing. Since the thermally conductive portion of the elastomeric member is also electrically insulative, no electrical communication is permitted between the circuit portion of the die and the lead, but heat produced by the circuit portion is transmitted through the thermally conductive portion to the lead so that it can be removed from the region of the pressure die. Since the lead, in a preferred embodiment of the present invention, extends outward from the pressure sensor die through a portion of the housing and toward an external portion of the housing, heat is efficiently carried away from the region of the pressure sensor die. It should also be understood that the plastic housing also provides another means by which heat can be transferred away from the heat generating components of the pressure sensor.

In one particular embodiment of the present invention, an opening is formed in the housing and the elastomeric member is disposed within the opening. The pressure sensor die is also disposed within the opening and a means is provided for urging the pressure sensor die into compressing contact with the elastomeric member. The elastomeric member is disposed between the lead and the first surface of the sensor die.

BRIEF DESCRIPTION OF THE DRAWINGS

The present invention will be more fully understood from a reading of the description of the preferred embodiment in conjunction with the drawings, in which:

FIG. 8 illustrates a sectional view of a combined housing arrangement made in accordance with a differential pressure sensor embodiment of the present invention; and FIG. 9 is a partial view of the device shown in FIG. 8.

DESCRIPTION OF THE PREFERRED EMBODIMENT

Figure 1:
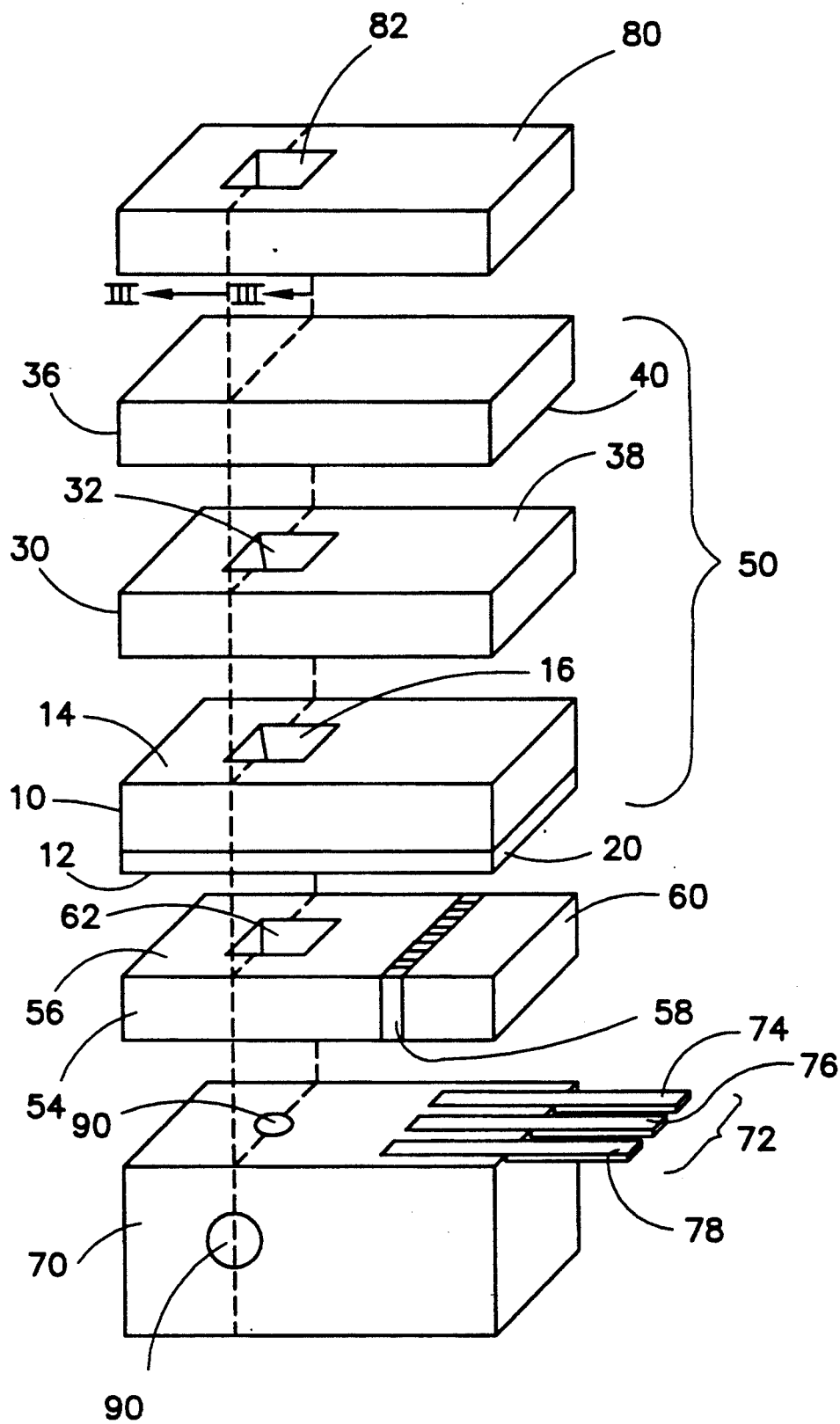
FIG. 1 shows an exploded view of an absolute pressure sensor embodiment of the present invention.

Throughout the Description of the Preferred Embodiment, like components will be identified with like reference numerals.

FIG. 1 illustrates an exploded view of one embodiment of the present invention. A pressure sensor die 10 is provided with a first surface 12 and a second surface 14. As will be described in greater detail below, the first surface 12 comprises a diaphragm portion, a circuit portion and a contact portion in a manner that is commonly used by those skilled. The second surface 14 of the pressure sensor die 10 has a cavity 16 formed therein. As is known to those skilled in the art, the cavity 16 can be formed by selectively etching the second surface 14. The cavity 16 does not extend completely through the thickness of the die 10. Instead, a layer 20 of a preselected material, such as silicon nitride, is formed at the first surface 12 and the etching procedure is controlled so that the cavity 16 extends downward through a portion of the thickness of the die, but not through layer 20. As will be described in greater detail below, this partial etching produces a diaphragm which is aligned with cavity 16. It should be understood that although the present invention is closely associated with the use of a pressure sensor die 10 such as that described above, the specific details of the die and its circuit portion are not limiting to the present invention. A second layer 30 of silicon can be attached to the second surface 14 of the die 10. It also is provided with an opening 32 which is etched to form a hole extending completely through the thickness of the second layer 30.

The pressure sensor can be constructed to form either an absolute pressure sensor or a differential pressure sensor. Both types of pressure sensor will be described herein. If the pressure sensor is intended for use as an absolute pressure sensor, a third layer 36 of silicon can be attached to the upper surface 38 of the second layer 30. This forms a sealed chamber between the lower surface 40 of the third layer 36 and the layer 20 of the pressure die 10. That chamber is confined within cavity 16 and cavity 32. As is known to those skilled in the art, the pressure die 10, the second layer 30 and the third layer 36 can be attached together under vacuum conditions to partially evacuate the chamber formed within the three layers. It should be understood that during the manufacture of the present invention, the pressure sensor die 10, the second layer 30 and the third layer 36 are prefabricated to form a single unitary structure 50 prior to assembling that structure in association with the other components of the present invention.

An elastomeric member 54 is provided by the present invention and comprises a cavity portion 56, a selectively conductive portion 58 and a thermally conductive portion 60. The thermally conductive portion 60 of the elastomeric member 54 is electrically insulative. An opening 62 is formed through the thickness of the elastomeric member 54 within the cavity portion 56. As will be discussed in greater detail below, the cavity portion 56 is aligned with the diaphragm portion of the first surface 12 of the die 10, the selectively conductive portion 58 of the elastomeric member 54 is aligned with the contact portion of the first surface 12 and the thermally conductive portion 60 is aligned with the circuit portion of the first surface 12.

With continued reference to FIG. 1, reference numeral 70 identifies a portion of a housing which comprises an electrically conductive member 72. In a preferred embodiment of the present invention, the electrically conductive member comprises a plurality of leads which are identified by reference numerals 74, 76 and 78. In a most preferred embodiment of the present invention, the central lead 76 is shaped to be larger than the other two leads, 74 and 78. One purpose for this shaping of the central lead 76 is to provide a more significant surface so that more heat can be radiated away from the pressure sensor die.

The selectively conductive portion 58 is disposed between the contact portion of the first surface 12 and a portion of the electrically conductive member 72. This provides electrical contact between the contact portion and the leads in a manner which is known to those skilled in the art and which is selectively conductive in a direction through the thickness of the elastomeric member 54, but which does not permit electrical shorting between the leads of the electrically conductive member 72. The thermally conductive portion 60 of the elastomeric member 54 is disposed between the electronic components formed in the first surface 12 and the leads of the electrically conductive member 72. The thermally conductive portion 60 provides an efficient heat conducting path downward from the first surface 12 to the leads and supporting structure.

In a preferred embodiment of the present invention, the leads are encapsulated within the material of the housing and are disposed at the bottom of an opening formed in the housing. The opening is not illustrated in FIG. 1, but will be described below.

With continued reference to FIG. 1, an elastomeric member 80 is disposed above the structure 50 and is disposed between another portion 100 of the housing (not shown in FIG. 1) and the structure 50. Although not absolutely required in all embodiments of the present invention, the elastomeric member 80 provides a resilient component disposed between the structure 50 and the portion 100 of the housing which is not shown in FIG. 1. The dashed lines in FIG. 1 represent a plane that passes through all of the individual components illustrated in FIG. 1.

Figure 2:
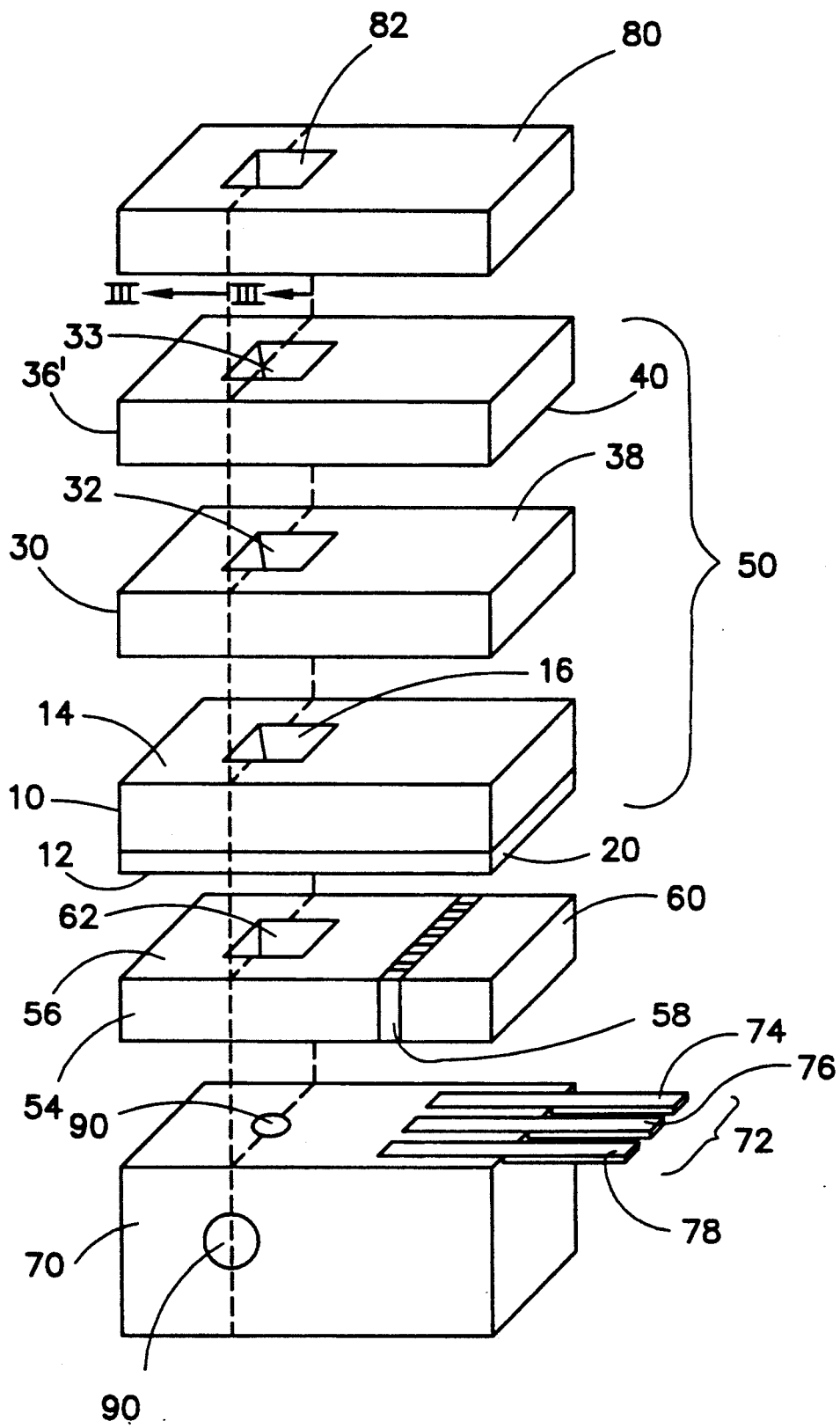
FIG. 2 shows an exploded view of a differential pressure sensor embodiment of the present invention.

FIG. 2 represents another embodiment of the present invention. Although it is very similar to the illustration of FIG. 1, it represents the particular configuration that can be used to provide a differential pressure sensor made in accordance with the present invention. As can be seen by comparing FIGS. 1 and 2, the third member 36 is not present in FIG. 2. Instead, it is replaced by a third member 36' which has an opening 33 formed therethrough. This opening 33 is aligned with opening 32 formed in the second layer 30. In addition, it is aligned with opening 82 formed in an elastomeric member 80 which is disposed above the third layer 36'. As can be seen, openings 82, 33, 32 and cavity 16 are aligned to form a continuous channel that provides fluid communication between a pressure source disposed above opening 82 and the diaphragm formed in the first surface 12 of the sensor die 10. It should be understood that the illustrated differences between FIGS. 1 and 2 are not limiting to the present invention but, instead, are intended to show that the present invention can be applied to both an absolute pressure sensor such as that shown in FIG. 1 and a differential pressure sensor such as that shown in FIG. 2. The dashed lines in FIG. 2 illustrate a particular plane taken through all of the components shown in FIG. 2.

Figure 3:
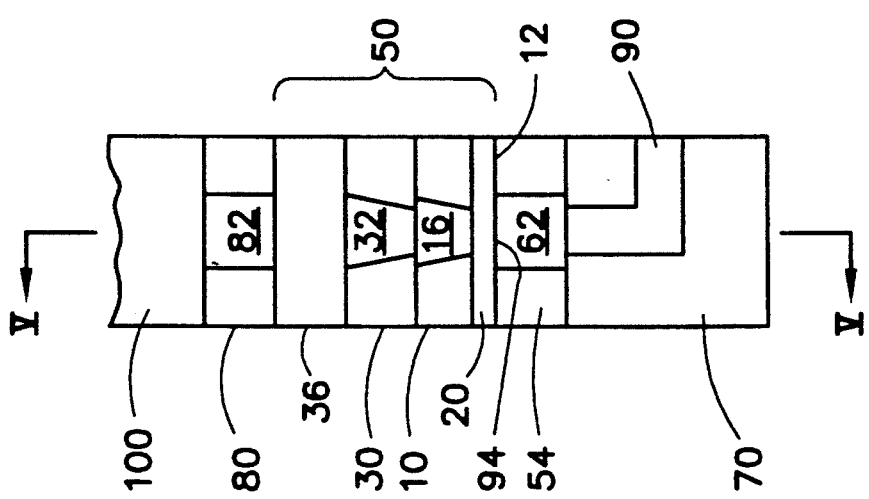
FIG. 3 is a sectional view of FIG. 1.

FIG. 3 illustrates a section view taken of the device shown at the plane illustrated by the dashed lines in FIG. 1. In addition, FIG. 3 shows the various components of FIG. 1 placed in contact with each other rather than in an exploded view. In FIG. 3, the portion of the housing 70 is shown with a means 90 formed in it to provide fluid communication between a first pressure from a source external to the housing and the diaphragm portion 94 formed in the first surface 12 of the pressure sensor die 10. This first pressure is disposed in fluid communication with opening 62 that is formed through the thickness of the elastomeric member 54. The combination of the third layer 36, the second layer 30 and the pressure sensor die 10 form a sealed chamber which comprises cavity 16 and opening 32 as shown. As described above, the pressure sensor die 10, the second layer 30 and the third layer 36 are typically prefabricated, as represented by reference numeral 50, prior to their assembly with the other components shown in FIG. 3.

Reference numeral 100 identifies a portion of the housing which is provided as a means for urging the pressure sensor die 10, through elastomeric member 80 and assembly 50, downward against the elastomeric member 54 and, in turn, for urging the elastomeric member 54 downward in contact with the leads shown in FIG. 1. This means for urging these components downward against the portion of the housing identified by reference numeral 70 compresses the elastomeric member 54 between the first surface 12 of the sensor die and the electrically conductive member 72. This downward pressure and compressive force provide improved thermal contact between the electronic components formed in the first surface 12 and the leads and, in turn, provides improved electrical contact between the contact portion of the first surface 12 and the leads. The leads are not visible in the section views of FIGS. 3 and 4.

Figure 4:
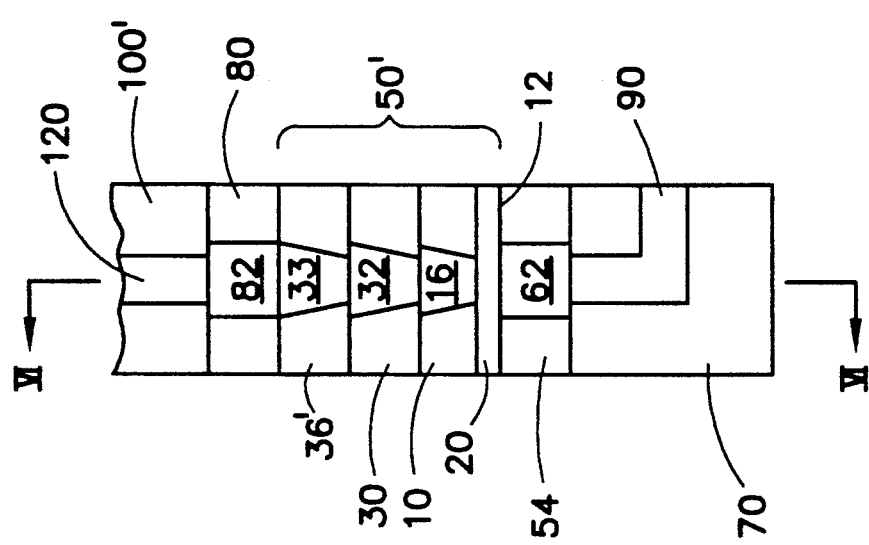
FIG. 4 is a sectional view of FIG. 2.

FIG. 4 is a section view of the illustration of FIG. 2 taken at the plane illustrated by the dashed lines in FIG. 2. As can be seen, most of the components shown in FIG. 3 are the same as those in FIG. 4. However, it should be noted that the third layer 36' is different from the third layer 36 in FIG. 3 because it is provided with an opening 33 which extends through its thickness. This opening 33 is provided so that a port 120 can be disposed in the upper housing portion 100' to provide a means for connecting a second pressure in fluid communication with the cavity 16. As can be seen in FIG. 4, this fluid communication is provided by the association of opening 82, opening 33, opening 32 and cavity 16. The second pressure is disposed on the cavity side of the diaphragm of sensor die 10 and the first pressure, through conduit 90 and opening 62, is disposed in fluid communication with the diaphragm. These two pressures, disposed on opposite surfaces of the diaphragm, permit the present invention to be used in association with the pressure sensor that is used to measure differential pressure. In FIGS. 3 and 4, it should be understood that the components identified by reference numerals 50 and 50' are silicon devices.

With reference to FIGS. 3 and 4, it can be seen that both illustrated embodiments of the present invention are generally similar in the characteristics of providing improved thermal communication between the electronic components on the first surface 12 and leads which serve to remove heat from the region of the pressure sensor. If the thermally conductive portion of the elastomeric member 54 was not provided, the heat generated by the components on the first surface 12 of the die 10 would not have an efficient way of escaping from the region of the die 10 and could possibly interfere with the proper operation of the pressure sensor circuitry. In addition, a build up of heat in this manner could adversely affect the operation of the diaphragm and its associated piezoresistive components.

Figure 5:
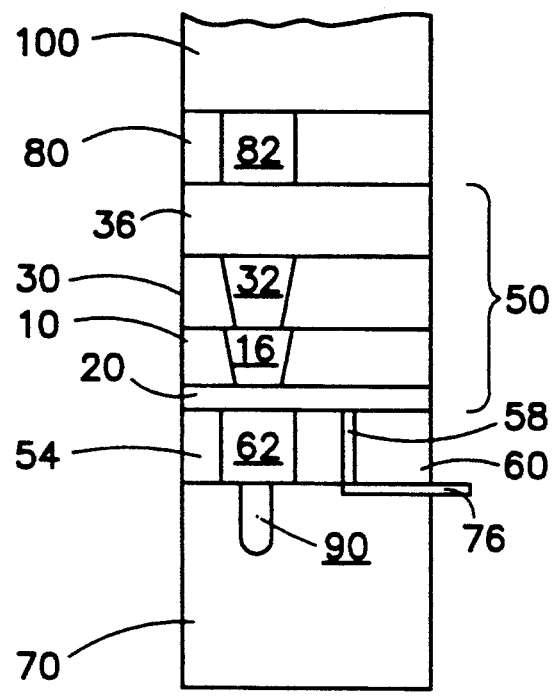
FIG. 5 is a sectional view of FIG. 3.

FIG. 5 shows the section view of FIG. 3 and illustrates the relationship between the selectively conductive portion 58 of the elastomeric member 54 and the electrically conductive member which is illustrated by lead 76. In addition, the relationship between the thermally conductive portion 60 of the elastomeric member 54 and lead 76 is shown. The relationship between the other components in FIG. 5 have been described in detail above and will not be repeated herein.

Figure 6:
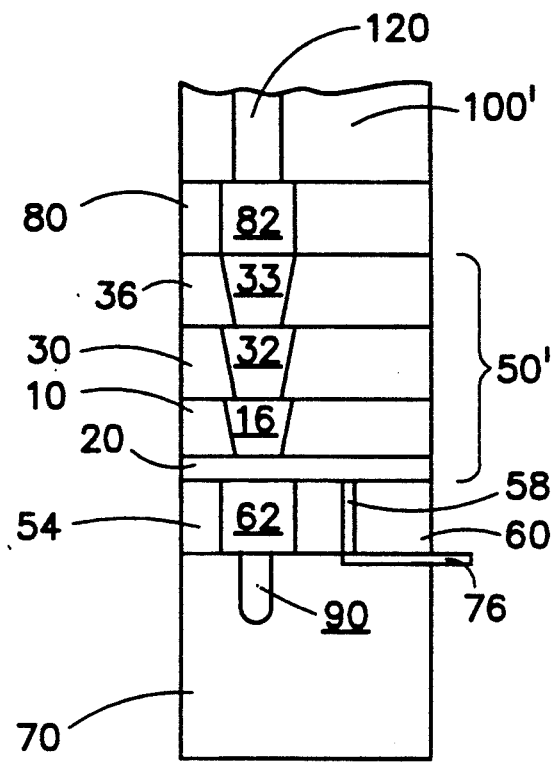
FIG. 6 is a sectional view of FIG. 4.

FIG. 6 illustrates the section view of the device shown in FIG. 4. As described above in conjunction with FIG. 5, FIG. 6 also demonstrates the relationship between the selectively conductive portion 58 of the elastomeric member 54 and lead 76. In addition, it shows the relationship between the thermally conductive portion 60 of the elastomeric member 54 and lead 76. As described above in conjunction with FIG. 4, FIG. 6 also illustrates the manner in which the diaphragm of the sensor die 10 is disposed in fluid communication with both a first pressure, through opening 62 and conduit 90, and a second pressure, through cavity 16, opening 32, opening 33, opening 82 and conduit 120.

Figure 7:
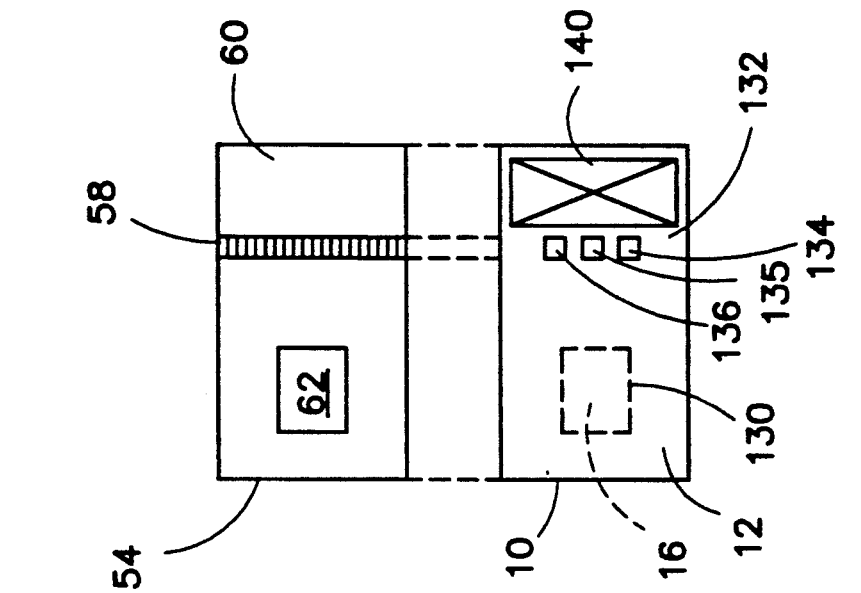
FIG. 7 shows the pressure sensor die and elastomeric member of the present invention.

FIG. 7 illustrates a pressure sensor die 10 alongside an elastomeric member 54 in order to more specifically illustrate the relationship between their various portions. The sensor die 10 comprises a diaphragm portion which is illustrated by dashed lines 130 which represent the location of the cavity 16 that is formed under the first surface 12. It should be understood that the cavity 16 does not penetrate through the first surface 12 and would therefore not be visible in the view of the sensor die 10 shown in FIG. 7. However, the cavity 16 is disposed under the first surface 12 at the region represented by dashed lines 130. The first surface 12 also comprises a contact portion 132 on which contacts, such as those illustrated by reference numerals 134, 135 and 136, are disposed The first surface 12 of the sensor die 10 also comprises a circuit portion that is represented by box 140. It should be understood that the circuit portion 140 of a sensor die comprises a very large plurality of electronic components and conductive paths connected therebetween as is well known by those skilled in the art. The circuit portion 140 provides the electronic circuitry to perform numerous functions in relation to the signals received from piezoresistive components disposed on the diaphragm above cavity 16. For simplicity, the circuit portion 140 is illustrated by a rectangle box with an X therein to show its general location on the first surface 12.

With continued reference to FIG. 7, an elastomeric member 54 is shown with its opening 62 extending through its thickness. In addition, a selectively conductive portion 58 extends through its thickness. The thermally conductive portion 60 is electrically insulative. When the elastomeric member 54 is disposed on the first surface 12 of the die 10, opening 62 is aligned with the diaphragm above cavity 16, as illustrated by dashed lines 130. In addition, the selectively conductive portion 58 is aligned with the contact portion 132 and is disposed over the contacts, 134,135 and 136. The thermally conductive portion 60 is disposed over the circuit portion 140 so that the heat generated by the components within the circuit portion 140 can be removed and conducted toward the leads as described above.

FIG. 8 is an illustration of the embodiment of the present invention shown in FIGS. 4 and 6 which is particularly adapted to provide a differential pressure sensor. The housing structure of the present invention comprises two portions, 70 and 140. One portion 70 of the housing is provided with an opening 144 formed therein. The electrically conductive member, represented by central lead 76 in FIG. 8, is encapsulated within the material of the housing portion 70 and extends into a portion of opening 144 and is exposed thereto. When the sensor die 10 and the elastomeric member 54 are disposed within opening 144, the thermally conductive portion 60 and selectively conductive portion 58 are disposed in contact with the leads in the manner described above. Portion 100' of housing portion 140 is shaped to be received in opening 144 in a manner which permits it to force sensor die 10 toward the elastomeric member 54 and compress it against the electrically conductive member which is encapsulated within housing portion 70. An O-ring 151 is provided to form a seal around the operative components of the present invention and is disposed in a generally annular opening 150 formed in a surface of housing portion 70. In addition, a protrusion 160 is shaped to be received in clearance association within an opening 162. The function of protrusion 160 and opening 162 will be discussed in greater detail below in conjunction with FIG. 9.

With continued reference to FIG. 8, it can be seen that conduit 90 provides fluid communication between a first pressure from an external source and the diaphragm of the sensor die through opening 62 formed in the elastomeric member 54. In addition, it can be seen that conduit 120 provides a means for connecting the cavity 16 of the pressure sensor die in fluid communication with an external second pressure through openings 32 and 33 as described above. The housing is provided with a socket portion 160 to facilitate electrical connection the leads and an external cable.

FIG. 9 illustrates the operation of protrusion 160 and opening 162. Two capacitors are connected in electrical communication with leads 74, 76 and 78. Capacitor 200 has conductive ends 201 and 202. Capacitor 204 has conductive ends 204 and 205. A selectively conductive elastomeric member 210 is disposed between the capacitors and the leads. When the protrusion 160 is forced into opening 162, the elastomeric member 210 is compressed between the capacitors and the leads. Capacitor 200 is connected across leads 76 and 78 and capacitor 204 is connected across leads 74 and 76. These capacitors provide electromagnetic interference (EMI) protection for the pressure sensor.

Although the present invention has been illustrated in particular detail and described in terms of two preferred embodiments, it should be understood that alternative embodiments of the present invention are also within its scope.

I claim:

1. A pressure sensor, comprising:
   a sensor die having a diaphragm portion, a circuit portion and a contact portion on a first surface of said sensor die, said sensor die having a second side with a cavity formed therein, said cavity being aligned with said diaphragm portion;
   an elastomeric member having a cavity portion, a selectively conductive portion and a thermally conductive portion, said thermally conductive portion being electrically insulative;
   first means for connecting said diaphragm portion of said first surface in fluid communication with a first pressure port of said housing;
   a housing having at lease one electrically conductive lead partially encapsulated therein; and
   an opening formed in said housing, a portion of said lead being disposed in said opening, said elastomeric member being disposed in contact with said first surface of said sensor die, said cavity portion being disposed in contact with said diaphragm portion, said selectively conductive portion being disposed in contact with said contact portion, said thermally conductive portion being disposed in contact with said circuit portion, said thermally conductive portion being disposed in contact with said lead.

2. The sensor of claim 1, wherein:
   said sensor die and said elastomeric member are disposed within said opening.

3. The sensor of claim 1, further comprising:
   means for compressing said elastomeric member and said sensor die together.

4. The sensor of claim 1, further comprising:
   means for compressing said elastomeric member between said sensor die and said lead.

5. The sensor of claim 1, further comprising:
   second means for connecting said cavity formed in said second surface in fluid communication with a second pressure port of said housing.

6. A pressure sensor, comprising:
   a housing having an electrically conductive member encapsulated therein:
   an opening formed in said housing, a portion of said electrically conductive member being disposed in said opening;
   a sensor die comprising a first surface and a second surface, said first surface having a plurality of electronic components formed thereon, said first surface of said sensor die further comprising a contact portion and a diaphragm portion;
   first means for connecting said diaphragm portion in fluid communication with a first pressure;
   an elastomeric member having a thermally conductive portion, said thermally conductive portion being electrically nonconductive;
   said thermally conductive portion being disposed in contact with said plurality of components and in contact with said electrically conductive member; and
   means for urging said sensor die, said elastomeric member and said electrically conductive member together.

7. The sensor of claim 6, wherein:
   said electrically conductive member comprises three leads.

8. The sensor of claim 1, wherein:
   said elastomeric member further comprises a selectively conductive portion and a cavity portion, said selectively conductive portion being disposed in contact with said contact portion, said cavity portion being disposed in contact with said diaphragm portion.

9. The sensor of claim 8 further comprising:
   a recess formed in said second surface, said recess being aligned with said diaphragm portion.

10. The sensor of claim 6, wherein:
    said elastomeric member and said sensor die are disposed in said opening.

11. The sensor of claim 6, further comprising:
    second means for connecting said recess in fluid communication with a second pressure.

12. A pressure sensor, comprising:
    a housing having a electrically conductive member attached thereto;
    a sensor die having a first surface and a second surface, a plurality of electronic components being formed on said first surface;
    an elastomeric member having a first portion which is thermally conductive and electrically insulative, said first portion being disposed in contact with said plurality of electronic components and with said electrically conductive member, said first surface further comprises a contact portion and a diaphragm portion, said elastomeric member further comprises a selectively conductive portion and a cavity portion, said cavity portion being disposed in contact with said diaphragm portion, said selectively conductive portion being disposed in contact with said contact portion;
    means for compressing said elastomeric member between said sensor die and said electrically conductive member
    first means for connecting said diaphragm portion in fluid communication with a first pressure; and second means for connecting said cavity portion in fluid communication with a second pressure.

13. The sensor of claim 12, wherein:
said elastomeric member and said sensor die are disposed within an opening formed in said housing.

14. The sensor of claim 12, wherein:
said electrically conductive member comprises three leads.

15. The sensor of claim 14, wherein:
said electrically conductive member is disposed within said opening.

* * * * *